Sept. 12, 1961   YOSHIO KINOSHITA   2,999,362
AUTOMATIC SAFETY DEVICE FOR HYDRAULIC BRAKE
Filed Sept. 4, 1958
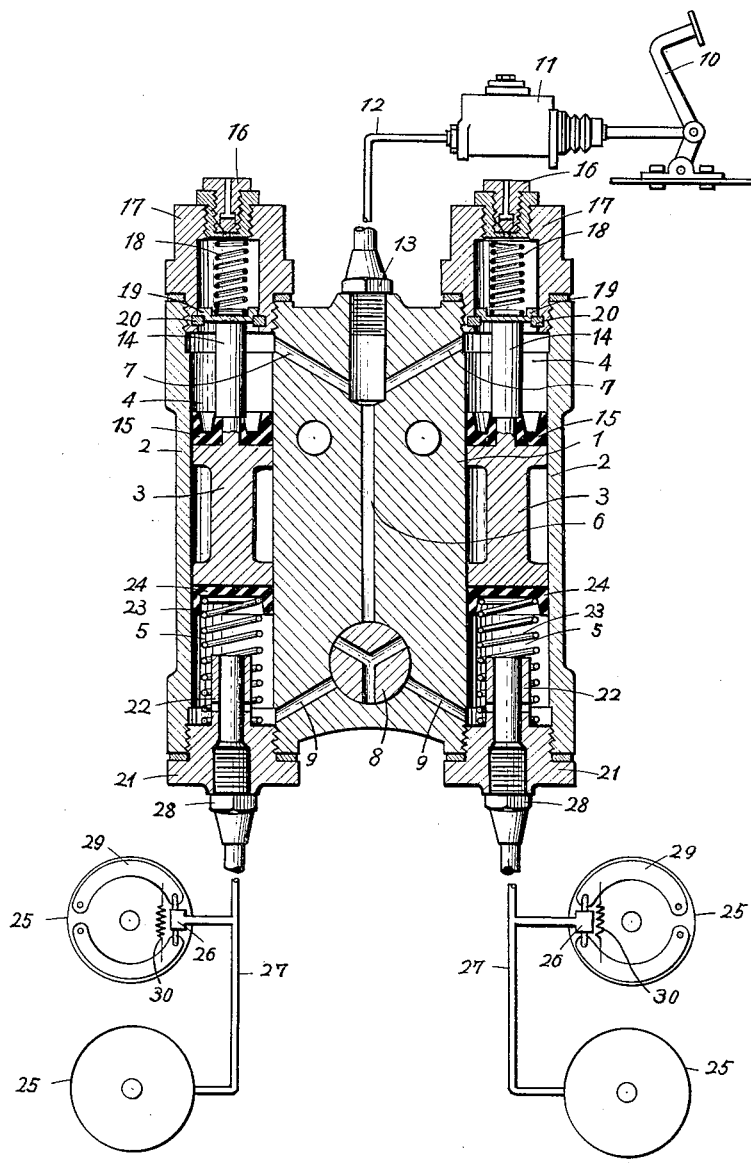
INVENTOR
YOSHIO KINOSHITA
BY
George B. Chisholm
ATTORNEY

United States Patent Office 2,999,362
Patented Sept. 12, 1961

2,999,362
AUTOMATIC SAFETY DEVICE FOR HYDRAULIC BRAKE
Yoshio Kinoshita, 4 Kawashima-cho, Nakano-ku, Tokyo, Japan
Filed Sept. 4, 1958, Ser. No. 759,046
2 Claims. (Cl. 60—54.5)

This invention relates to hydraulic pressure braking system and more particularly to an automatic safety device for a hydraulic brake composed of a pair of cylinders arranged on both sides of the brake assembly body to facilitate braking in case of fluid expansion or leakage in some part of the braking system.

Heretofore, there have been cases of inoperative brake action owing to the breakage of a brake rubber cup inside the wheel cylinder or fluid-leakage due to the break of line pipe or the flexible rubber hose etc. in the hydraulic brake line.

Another object of the invention is to provide an automatic safety device for hydraulic brake equipped with two cylinders arranged in parallel and divided into primary chamber and secondary chamber by means of a piston, the secondary chamber of each cylinder is related, through the line pipe respectively to the brake of the front wheels and that of the rear wheels. In this way, in case of trouble, either of the two wheels will be always usefully braked.

A further object of the invention is to provide an automatic safety device for hydraulic brake in order to make the cost of the product cheap, the above-mentioned cylinder and the body provided with fluid passage are made into a monobloc and the number of the line pipe exposed to outside is made as few as possible in order to prevent the occurrence of trouble and also to simplify the piping operation and further a three-way control valve being secured at the junction of the lower fluid passage in order to make the filling of brake fluid and the exhaustion of air easier and more perfect.

The invention also contemplates providing a means by which the construction of the primary chamber which is formed by partitioning off part of the cylinder with piston, an unexpected braking shock due to fluid expansion caused by the overheating of the brake shoes can be prevented.

Difficulty is also experienced because of the expansion of brake fluid due to hot weather. Although many attempts have been made to provide a hydraulic braking system which is free of the foregoing difficulties, none, as far as I am aware have ever been too successful when put into practice.

An object of the present invention is to provide an automatic safety device for hydraulic brakes.

Another object of the present invention is to provide an automatic safety device for hydraulic brakes which is of simple construction, inexpensive to manufacture, and which can readily be incorporated into present day automobiles.

In drawing:
The figure is a vertical section view of an automatic safety device for hydraulic brakes contemplated herein.

Referring to the drawing for more specific details of the invention, cylinders 2 are arranged in parallel on both sides of body 1, each of said cylinders 2 has a piston 3 which divides the cylinders into a first chamber 4 and a second chamber 5. In body 1, there is a cross tube 6 which communicates with first chamber 4 by means of the upper fluid passage 7 and with the second chamber 5 by means of the lower fluid passage 9 through a three-way control valve 8 at the bottom of cross tube 6. The upper end of said cross tube 6 is connected to pipe 12 of the master cylinder 11 transmitting the action of the brake pedal 10 by means of nut 13.

To piston 4, inserted in cylinder 2, there is provided an elongated stopper or stop means 14 on the side of first chamber 4. This stopper 14 is fitted with a rubber cup to prevent fluid pressure leakage. On top of first chamber 4 is screwed a cup-shaped lid 17 having an airbleeder plug 16. Inside said cup-shaped lid 17 is a flush washer 19 which is retained in place by the pressure of top spring 18. The spring is stopped by snap ring 20.

Lower lid 21 of second chamber 5 has a lower stopper or stop means 22 protruding inside said second chamber, said stopper is fitted with spring 23 sufficiently resilient to maintain piston 3 in position between the two chambers, the pressure of spring 23 being applied to the lower surface of piston 3 through fluid leakage protective rubber cup 24.

Second chamber 5 controls the front and rear wheels by means of joint 28 connected to pipe 27 which controls the wheel cylinder 26 and brake drum 25. Lower lid 21 is screwed onto the lower end of cylinder 2. Associated with the brake shoe 29 is a return spring 30.

In operation, first the three-way control valve 8 is opened. This valve is located at the junction of cross tube 6 and lower fluid passage 9 which branches off at the bottom of said cross tube and communicates with second chamber 5. The brake pedal 10 is depressed five or six times so as to impose pressure on cylinder 26. While pressing on the brake pedal 10, air bleeder plug 16 on upper lid 17 of cylinder 2 is opened. As soon as air and a small amount of fluid is discharged, shut the air bleeder plug 16. By repeating the same operation as above three to four times for both wheel cylinders on the right and on the left, the air contained in the two cylinders 2, the brake line pipe and all the wheel cylinders will be completely discharged and said parts will be filled with brake fluid. The three-way control valve 8 can then be closed and remains closed while in operation. To apply the brakes, pedal 10 is depressed and the hydraulic pressure in master cylinder 11 will be imposed on first chamber 4 in both cylinders 2 through pipe 12 and upper fluid passage 7 past the junction of cross tube 6 in body 1. Owing to said pressure, the piston 3 will be pushed downward through rubber cup 15 against return spring 23. In this way, pressure is exerted on the brake fluid contained in second chamber 5 and this pressure is transmitted to wheel cylinder 26 through pipe 15 to brake the front and rear wheels. When brake pedal 10 is released by the foot and the brake fluid contained in wheel cylinder 26 returns to its former state owing to elasticity of the return spring 30 in the brake shoes 29 and releases the device from braking operation. During this operation since the descent of the piston 3 is stopped at the moment when the rubber cup 24 comes in contact with the upper end of the stopper 22, the length of said stopper 24 can be suitably adapted to the capacity of second chamber 5 and according to the vehicle for which it is utilized, such as ordinal vehicles. When the brake fluid in the wheel cylinder 26 expands owing to overheating of the brake drum 25 and when brake shoe 29 is excessively used, or when going down a long mountain, stop means or stopper 14 in second chamber 4 and spring 18 forces the stopper upper head to engage washer 19. Without stopper 14 and spring 18, piston 3 would be pushed upward owing to the expansion of the brake fluid and smooth braking action would not be possible. Now if the construction does not allow for any ascent of the piston there will be an unexpected braking action because of brake fluid expansion. Thus there is an inconsistency. This inconsistency is solved by a construction which enables stopper 14 and washer 19 to be pushed downward by means of spring 18. This spring is so constructed that it does not allow the piston to ascend to the extent that the gap between drum 25 and shoes 29 become so large as to render braking action difficult or inoperative. Thus spring 18 permits a small action of piston 3 against the spring action. If the brake fluid expands there is enough play so that unexpected braking action does not take place.

The depression of the brake pedal and its release is transmitted to the primary chambers arranged in parallel directly, and indirectly to the second chambers by means of the piston. In this way, leakage of brake fluid from the second chamber is prevented. Should the rubber cup or the flexible rubber hose, etc. in the wheel cylinder be broken and brake fluid-leakage occur, braking action on the side of the bad wheel would become inoperative, whether it is a front or rear wheel. But braking action on the corresponding wheel on the other side suffers no damage and is perfect. By the construction herein contemplated, even after a leak on one side good braking action can be had without danger. If the trouble due to the brake fluid leakage happens, as mentioned above, the driver can notice it at the brake pedal operation by the delay in braking action on the side of a bad wheel, whether it is the front wheels or the rear ones. Therefore he can fix the damaged part before more serious trouble starts. In the present invention, although the first chamber is provided with a stopper and spring the braking action is not lowered nor does unexpected braking action result in the case of brake fluid expansion.

The present invention may be embodied in other specific form without departing from the spirit thereof. It is therefore desired that the present embodiments be considered in all respects as illustrative and not restrictive, reference being had to the appended claims rather than to foregoing description to indicate the scope of the invention.

What is claimed is:

1. A safety arrangement for a hydraulic braking system comprising in combination, a housing; at least one pair of spaced apart cylinders in said housing; a piston mounted for reciprocation in each of said cylinders dividing each of said cylinders into a first chamber located towards the one end and a second chamber located towards the other end of said cylinder; a cup shaped lid over said first chamber; a second lid defining the end of said second chamber; elongated movable stop means extending from said piston the length of said first chamber adapted to engage the far end of said chamber, said stop means normally limiting the upward thrust of said piston in said first chamber; a ring valve seat almost at the far end of said first chamber, said elongated stop means passing therethrough; valve means adapted to engage said valve seat partially preventing fluid flow therethrough, said valve means straddling said elongated stop means and defining the far end of said first chamber, the far end of said elongated stop means normally engaging said valve means; a top spring expandably biased between the top of said cup-shaped lid and said valve means normally closing said valve partially preventing fluid flow and holding said stop means; a second spring in said second chamber biasing said piston towards said first chamber; a fluid master cylinder pressure chamber associated with said cylinders; fluid conduits between said pressure chamber and said first and second chambers; a second chamber valve adapated when closed to isolate said second chambers from said pressure chamber, said chamber valve normally being in said closed position; means to transmit the fluid pressure compressed in said second chamber to a mechanical element for braking purposes; and means for applying pressure to said pressure chamber to expel brake fluid therefrom to completely fill said second chambers when the chamber valve is in open position and to only fill the space between the piston and the valve means in the first chambers, so that when brake pressure is applied to said pressure chamber when the chamber valve is closed, said pressure is transmitted by said fluid conduits only to said first chambers, the fluid pressure therein thereupon pushing upon said piston which in turn forces braking pressure to be transmitted to said mechanical elements for braking purposes, but when said brake fluid expands due to heat the valve means is opened thereby to provide a space for taking up the expansion, the fluid in the second chamber pushing against said piston which in turn pushes against said stop means and said top spring.

2. A device as claimed in claim 1 having air bleeding means in said cylinders.

References Cited in the file of this patent

UNITED STATES PATENTS

| | | |
|---|---|---|
| 1,652,232 | Blasdel | Dec. 13, 1927 |
| 1,954,534 | Norton | Apr. 10, 1934 |
| 2,166,962 | Masteller | July 25, 1939 |
| 2,203,908 | Hess | June 11, 1940 |
| 2,301,037 | Greene | Nov. 3, 1942 |
| 2,774,958 | Aldasoro | Dec. 18, 1956 |